May 11, 1926.  
J. L. STOLTZ  
RESILIENT WHEEL  
Original Filed Sept. 4, 1923

1,584,679

J. L. Stoltz
INVENTOR

BY Victor J. Evans
ATTORNEY

Patented May 11, 1926.

1,584,679

UNITED STATES PATENT OFFICE.

JOHN L. STOLTZ, OF SUMNER, ILLINOIS.

RESILIENT WHEEL.

Application filed September 4, 1923, Serial No. 660,871. Renewed October 8, 1925.

This invention relates to resilient wheels, and an object of the invention is to provide a vehicle wheel in which a plurality of resilient spokes are provided for connecting the rim structure to the hub structure of the wheel, said spokes being arranged in pairs one of which extends at right angles to the other, so as to permit the absorbing of shocks occasioned by the traveling of a vehicle equipped with the wheels over rough surfaces, the relative position of the spokes with respect to each other and to the axis of the wheel being such as to absorb the shock upon the initial engagement of the wheel with an obstruction.

Other objects of the invention will appear in the following detailed description taken in connection with the accompanying drawing wherein:—

Figure 1:
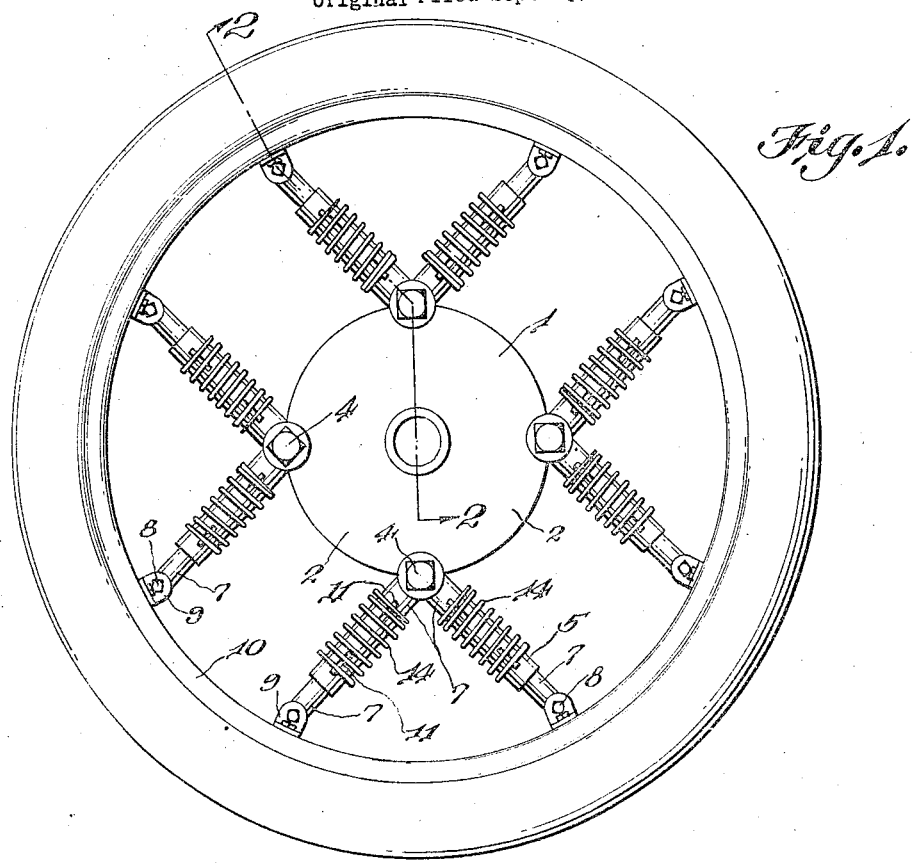
Fig. 1 is a side elevation of the improved wheel.
Figures 2, 3:
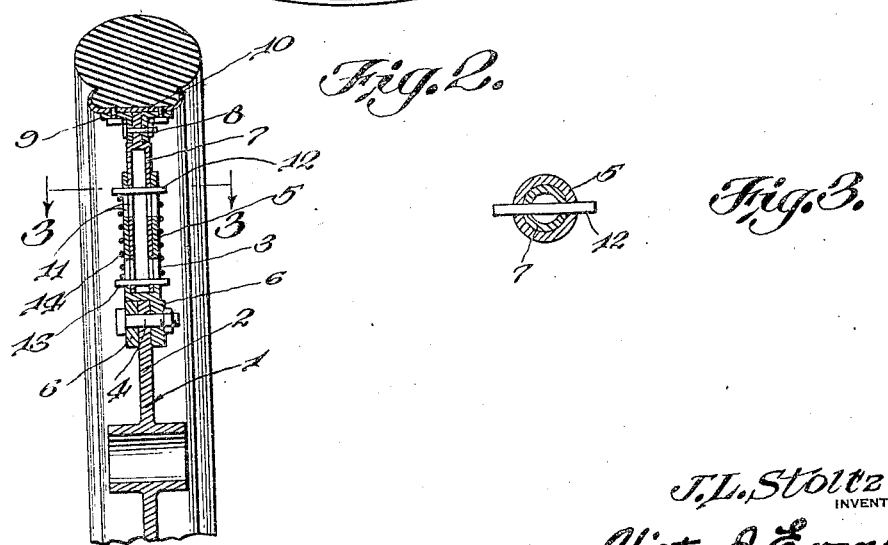
Fig. 2 is a section on the line 2—2 of Fig. 1.
Fig. 3 is a detail section on the line 3—3 of Fig. 2.

Referring more particularly to the drawings, the improved resilient wheel comprises a hub 1, which includes a disc 2 to the perimeter of which at spaced points the spoke structures 3 are attached. The spoke structures 3 are arranged in pairs disposed one at right angles to the other, and their inner ends are pivotally mounted upon bolts 4 which serve as connections between the heads 6 and the hub disc 2. Each of the spoke structures 3 comprises an outer tubular shell 5 upon the inner end of which a laterally offset head 6 is formed which engages upon one side of the hub disc 2. The tubular shell 5 telescopically receives the inner tubular shell 7, which is pivotally connected as shown at 8 to a pair of angle plates 9 attached to the inner perimeter of the tire carrying rim 10. The tubular shells 5 and 7 are provided with aligning longitudinally extending slots 11 through which transversely extending pins 12 and 13 extend. Springs 14 are coiled about the tubular shell 5 and their ends engage against the ends of the pins 12 and 13 which project beyond the perimeter of the shell 5, as clearly shown in Figs. 2 and 3 of the drawings.

The pins 12 are preferably rectangular shape in cross section and are slidable in the slots 11 to permit yielding slidable shock absorbing relative movement of the shells 5 and 7 to permit the absorbing of shocks between the rim 10 and hub 1.

It is, of course, to be understood that the invention may be constructed in other manners and the parts associated in different relations and, therefore, I do not desire to be limited in any manner except as set forth in the claims hereunto appended.

Having thus described my invention what I claim is:

1. A resilient wheel comprising a hub including a disc, a rim, a plurality of resilient spokes connecting said hub disc and rim, said spokes arranged in pairs with the spokes of each pair disposed substantially at right angles to each other, said spokes including outer shells, laterally offset heads on the inner ends of said outer shells and engaging against the side of the hub disc, and pivotally connected to the hub disc, inner shells pivotally connected to the inner perimeter of the rim and slidably extending into the first named shells, and springs for cushioning the movement between the outer and inner shells.

2. A resilient wheel comprising a hub including a disc, a rim, a plurality of resilient spokes connecting said hub disc and rim, said spokes arranged in pairs with the spokes of each pair disposed substantially at right angles to each other, said spokes including outer shells, laterally offset heads on the inner ends of said outer shells and engaging against the side of the hub disc, and pivotally connected to the hub disc, inner shells pivotally connected to the inner perimeter of the rim and slidably extending into the first named shells, said shells provided with registering slots, pins extending transversely through the slots, and a coil spring positioned about each said outer shell and engaging said pins.

In testimony whereof I affix my signature.

JOHN L. STOLTZ.